United States Patent
Kaburlasos et al.

(10) Patent No.: US 8,806,243 B2
(45) Date of Patent: Aug. 12, 2014

(54) METHOD OF AND APPARATUS FOR ENERGY SAVINGS ASSOCIATED WITH A GRAPHICS CORE

(75) Inventors: Nikos Kaburlasos, Lincoln, CA (US); Eric C. Samson, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 278 days.

(21) Appl. No.: 13/338,354

(22) Filed: Dec. 28, 2011

(65) Prior Publication Data
US 2012/0169747 A1 Jul. 5, 2012

(51) Int. Cl.
G06F 1/32 (2006.01)
G06F 9/50 (2006.01)

(52) U.S. Cl.
CPC .......... *G06F 1/3203* (2013.01); *G06F 9/5044* (2013.01)
USPC ....................................................... 713/320

(58) Field of Classification Search
CPC ....... G06F 1/32; G06F 1/3203; G06F 1/3206; G06F 1/3234; G06F 9/5044
USPC ....................................................... 713/320
See application file for complete search history.

(56) References Cited

U.S. PATENT DOCUMENTS

| | | | |
|---|---|---|---|
| 2005/0034002 A1* | 2/2005 | Flautner | 713/322 |
| 2005/0132239 A1* | 6/2005 | Athas et al. | 713/300 |
| 2005/0268141 A1 | 12/2005 | Alben et al. | |
| 2007/0049133 A1 | 3/2007 | Conroy et al. | |
| 2007/0074011 A1 | 3/2007 | Borkar et al. | |
| 2010/0299545 A1* | 11/2010 | Lyu | 713/322 |
| 2011/0131430 A1* | 6/2011 | Krishnamurthy et al. | 713/320 |
| 2011/0173467 A1* | 7/2011 | Vaidyanathan et al. | 713/320 |
| 2011/0264938 A1 | 10/2011 | Henroid et al. | |
| 2011/0271283 A1 | 11/2011 | Bell, Jr. et al. | |
| 2012/0331476 A1* | 12/2012 | Saffre | 718/104 |
| 2013/0106881 A1* | 5/2013 | Hendry et al. | 345/522 |

OTHER PUBLICATIONS

Patent Cooperation Treaty, "PCT International Search Report and the Written Opinion of the International Searching Authority, or the Declaration", dated Mar. 25, 2013, for International Application No. PCT/US2012/068682, 10pgs.

* cited by examiner

*Primary Examiner* — Thomas Lee
*Assistant Examiner* — Danny Chan
(74) *Attorney, Agent, or Firm* — Buckley, Maschoff & Talwalkar LLC

(57) ABSTRACT

A method includes executing a workload on a graphics (GFX) core in a first mode the GFX core comprising a plurality of Subslices wherein each of the plurality of Subslices dissipates power. The method further includes calculating a number of clock cycles, Tfirst mode, required for the GFX core to perform the workload in the first mode during a first decision window comprising a plurality of clock cycles and calculating a number of clock cycles, Tsecond mode, required for the GFX core to perform the workload in a second mode during the first decision window wherein the second mode comprises executing the workload with fewer of the plurality of Subslices receiving power than when executing the workload in the first mode. It is then determined, based in part upon Tfirst mode and Tsecond mode, if an energy savings is possible by transitioning the GFX core to the second mode.

12 Claims, 6 Drawing Sheets

METHOD OF AND APPARATUS FOR ENERGY SAVINGS ASSOCIATED WITH A GRAPHICS CORE

BACKGROUND OF THE INVENTION

The processing of graphics data is often performed by a dedicated graphics (GFX) engine comprising a GFX core at which processing occurs. A typical GFX core makes use of multiple execution units (EUs) that may function in concert or independently of one another. When processing workloads are light, GFX core energy consumption may be partially optimized by transitioning the GFX core to an RC6 power-down state. However, in such an instance, the entire GFX core must transition to RC6 state at the same time. If any portion of the GFX core must become active, the entire GFX core must transition back to the RC0 active state. Such a regime may give rise to unnecessary power consumption when the entire GFX core is operating in the RC0 active state but the processing workload is relatively light. There may therefore exist a need to reduce power consumption by a GFX core to extend, for example, battery life.

BRIEF DESCRIPTION OF THE DRAWINGS

An understanding of embodiments described herein and many of the attendant advantages thereof may be readily obtained by reference to the following detailed description when considered with the accompanying drawings, wherein.

DETAILED DESCRIPTION OF EXAMPLE EMBODIMENTS

In accordance with various exemplary embodiments described herein, there is provided a method for reducing energy consumption and improving battery life in the case of light GFX core 12 workloads which allow for at least some RC6 state residency, while maintaining performance such as may be measured by the delivered frame rate. As a result, the exemplary embodiments described below differ from other methodologies known in the art to utilize power gating in order to optimize GFX core 12 performance within a given power budget and under heavy workload conditions.

Figure 1:
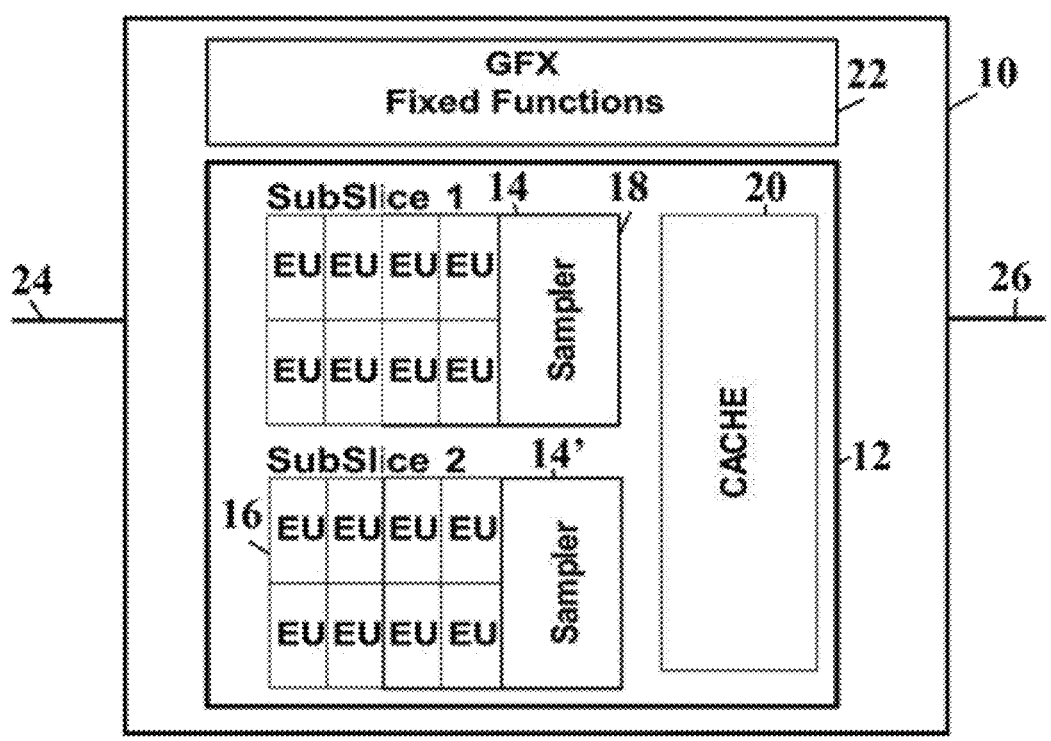
FIG. 1 is a schematic diagram of an exemplary and non-limiting embodiment of a graphics (GFX) engine.

With reference to FIG. 1, there is illustrated a schematic diagram of a graphics (GFX) engine 10. GFX engine 10 typically comprises a GFX core 12 that is comprised of a number of identical, or nearly identical, blocks which are shown as a plurality of Subslices 14, 14'. Each Subslice 14, 14' contains a number of Execution Units 16, or EUs 16, which perform arithmetic, logic operations and the like. Each Subslice 14, 14' may also comprise a Sampler logic module 18 (hereinafter, "Sampler 18") for the performance of texture processing. A GFX core 12 may comprise a large number of Subslices 14, 14'. While FIG. 1 illustrates a GFX core 12 comprised of only two Subslices 14, 14', such a configuration is adopted for the purpose of illustrating various non-limiting and exemplary embodiments disclosed herein. It is understood that in practice a GFX core 12 comprising any number of Subslices 14 each comprising any number of EUs may operate without departing from the teachings embodied herein.

Each Subslice 14, 14' may communicate with a cache 20. Cache 20 may store data in memory associated with cache 20 wherein such data may comprise instructions for the operation of GFX core 12 and GFX engine 10 as described more fully below. GFX engine 10 further comprises a GFX Fixed Function module 22 comprising a processor for performing various defined GFX functions including, but not limited to, the measurements, calculations and determinations described more fully below. GFX engine 10 comprises an input 24 for receiving data and/or instructions from a source external to GFX engine 10. Likewise, GFX engine 10 comprises an output 26 for transmitting data and/or instructions to an entity external to GFX engine 10.

In operation, GFX core 12 often has to process a very large number of triangles and texture elements, or, "texels". In such instances, it may prove necessary or otherwise advantageous to fully utilize all available EUs 16 and all Samplers 18 in a sustained fashion. In other instances wherein the GFX workload may be lighter, processing may not require the use of all EUs 16 and all Samplers 18 available in GFX core 12 for relatively long periods of time.

Figure 2:
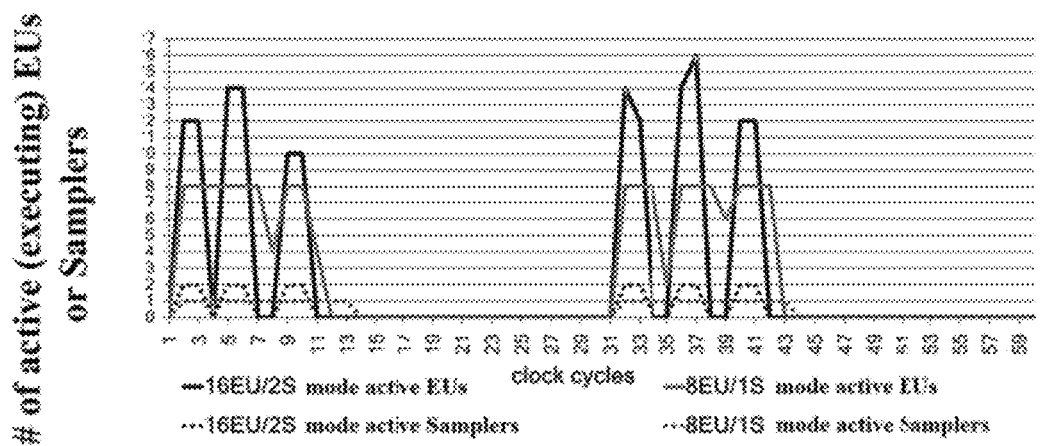
FIG. 2 is a diagram of the operation of a GFX core 12 according to an exemplary and non-limiting embodiment.

With reference to FIG. 2, there is illustrated a graph depicting the exemplary utilization of EUs 16 (black line) and Samplers 18 (black dotted line) over a span of clock cycles during which time there is encountered periodic burst GFX core 12 activity, such as is required to process a frame, wherein such activity is separated by idle intervals. When idle, GFX core 12 typically enters a low-power RC6 state and powers off. The active or idle GFX periods may, in a typical example, last for a number of milliseconds. However, in FIG. 2, such idle or active GFX periods are illustrated, solely for purposes of simplicity, as lasting only a relatively small number of clock periods.

The black curves in FIG. 2 represent the activity of an exemplary 16 EU/2 Sampler GFX core 12 comprising two Subslices 14 14', such as the exemplary GFX core 12 illustrated in FIG. 1. As used herein, use of the construction "X EU/Y Sampler" refers to a configuration comprising X number of EUs 16 and Y number of Samplers 18. The Y-axis of FIG. 2 illustrates the number of EUs 16 or Samplers 18 which are active (executing) during each clock cycle. Note that the workload assumed in this example is not heavy enough to keep all sixteen EUs 16 of GFX core 12 active during most clock cycles. This could be due, for example, to the nature of the workload or due to bottlenecks in other parts of the pipeline (e.g., a bottleneck in the GFX Fixed Function module 22, memory stalls, etc).

In the present example, it would seem beneficial to power down a portion of the GFX core 12, such as a number of EUs 16 or even an entire Subslice 14, in order to reduce leakage power, while maintaining a smaller number of EUs 16 powered up to serve the light workload submitted to the GFX engine 10. The gray curves in FIG. 2 represent the execution over time of the same workload applied to the black curves but assuming that said workload is submitted to a 16 EU/2 Sampler GFX core 12 as shown in FIG. 1 but with a single Subslice (eight EUs 16 and one Sampler 18) powered down. As used herein, when operating in such a mode, GFX core 12 is referred to as operating in an "8 EU/1 Sampler mode". If the activity curves of the sixteen EU GFX core 12 (black curves in FIG. 2) are known, it is possible to derive the same type of curves for the eight EU GFX core 12 (gray curves).

For example, assume that X threads are executing on GFX core 12 in 16 EU/2 Sampler mode on a given clock cycle N. If these same X threads were instead submitted to GFX core 12 in 8 EU/1 Sampler mode on the same clock cycle N, then if X<=8, all threads could execute on the GFX core 12 in 8 EU/1 Sampler mode (assuming that no other threads are pending for execution from previous clock cycles). If X>8 then only 8 threads would execute and the remaining X−8 threads would carry over for execution on the GFX core 12 in 8 EU/1 Sampler mode on clock cycle N+1 (along with whatever new threads are submitted on clock N+1).

Essentially, the area under the black curve illustrating EU activity of GFX core 12 in 16 EU/2 Sampler mode should be the same as the area under the gray curve illustrating EU activity of GFX core 12 in 8 EU/1 Sampler mode. Similar reasoning applies to the dotted gray and black curves illustrating Sampler activity.

As is illustrated in the example of FIG. 2, in most cases the operation of GFX core 12 in 8 EU/1 Sampler mode utilizes approximately the same or a slightly higher number of clock cycles than does GFX core 12 in 16 EU/2 Sampler mode to execute the same light workload. Given that the workload assumed in this example is light enough, the overall performance of the two GFX cores, measured for example in frames per second, would be approximately the same.

As illustrated in this example, when in 16 EU/2 Sampler mode, GFX core 12 spends a considerable percentage of time in RC6 state. Executing the same work load on GFX core 12 in 8 EU/1 Sampler mode would extend the periods of GFX core 12 activity a little and shrink the overall RC6 time by the same amount while delivering the same frame rate. Note, this might not be the case if GFX core 12 in 16 EU/2 Sampler mode experiences little or no RC6 residency. In such an instance, transferring the workload from GFX core 12 in 16 EU/2 Sampler mode to GFX core 12 in 8 EU/1 Sampler mode would likely require continual operation entirely in the RC0 state with no opportunity to implement an RC6 power down. Further, in such an instance, the continued operation of GFX core 12 in 8 EU/1 Sampler mode may require increasing the operating voltage and frequency and, hence, power dissipation, in order to maintain the same frame rate.

All things being equal, increases in GFX core's 12 operating voltage tend to result in higher power dissipation. Exemplary and non-limiting embodiments therefore focus on situations wherein a workload experienced by GFX core 12 is sufficiently light so as to allow for some RC6 residency even after power gating a portion of GFX core 12. As used herein, "power gating" refers to reducing the number of Subslices 14 and/or the number of EUs 16 and/or the number of Samplers 18 available for processing in GFX core 12.

In an exemplary embodiment, GFX core 12 may be power gated to transition from a 16 EU/2 Sampler mode to a 8 EU/1 Sampler mode. Only in the case where the workload experienced by a GFX core 12 is sufficiently light so as to allow for some RC6 residency even after power gating a portion of the GFX core 12 is one able to achieve power savings without adversely affecting performance.

Note that in the case when GFX core 12 operates with some RC6 residency, it is typically preferred that its voltage be set to the minimum operating value Vmin and its frequency to the maximum frequency fvmin possible at that voltage.

There is now described the method by which it is determined that a GFX core 12 comprised of multiple EUs 16 and Subslices 14 is executing a workload sufficiently light such that power savings may be achieved by power gating a portion of GFX core 12. While discussed herein with reference to an exemplary and non-limiting embodiment employing GFX core 12 operating in 16 EU/2 Subslice mode which power gates down to an 8 EU/1 Subslice mode, the operative concepts also apply to the general case of multi-EU, multi-Sampler GFX cores 12 which power down a portion of their EUs 16 or Subslices 14.

As it executes its workload, 16 EU/2 Subslice mode GFX core 12 keeps track of how many of its EUs 16 are executing threads during each clock cycle and collects this data over a window of time comprising a plurality of clock cycles and referred to herein as a "decision window". The decision window may be a sliding window wherein its starting point, ending point and duration are dynamically configured. Data collection during each decision window may be accomplished via hardware, via software, via periodic interrupts which allow the graphics driver to read counters and collect data, or through some combination of the aforementioned modalities. During or shortly after the collection of data during a decision window, GFX core 12 operating in 16 EU/2 Sampler mode calculates how many clock cycles would be required to execute the same workload that was executed within the decision window if only eight of its EUs 16 and one of its Samplers 18 were active in the same decision window. In an exemplary embodiment, this calculation is performed using the algorithm described above. From this calculation, one can calculate the number of clocks cycles T16 and T8 that GFX core 12 operating in 16 EU/2 Sampler mode or 8 EU/1 Sampler mode, respectively, would have to be active during such a decision window.

Assume that Lkg1, Lkg2 and Lkgrest represent the leakage power of Subslice 14, of Subslice 14' and of the rest (nonSubslice) logic of GFX core 12 in 16 EU/2 Sampler mode, respectively. Further assume that C16 and C8 are the switching capacitances, respectively, of GFX core 12 operating in 16 EU/2 Sampler mode or 8 EU/1 Sampler mode executing the same workload. The energy dissipated when in 16 EU/2 Sampler mode in the most recent decision window would be:

$$E1=((Lkg1+Lkg2+Lkgrest)+(\text{fvmin}*C16*V\text{min}2))*T16 \quad (1)$$

If GFX core 12 had executed the same workload over the same decision window with one of its Subslices 14 power gated, then the energy that it would have dissipated would be:

$$E2=((Lkg1+Lkgrest)+(\text{fvmin}*C8*V\text{min}2))*T8 \quad (2)$$

Therefore, the energy savings that would be achieved if this workload were executed in 8 EU/1 Sampler mode instead of in 16 EU/2 Sampler mode, would be:

$$\begin{aligned}E1-E2 &= ((Lkg1+Lkg2+Lkgrest)+(\text{fvmin}*C16*V\text{min}2))* \\ & \quad T16-((Lkg1+Lkgrest)+ \\ & \quad (\text{fvmin}*C8*V\text{min}))**T8 \\ &= Lkg2*T16+(Lkg2+Lkgrest)*(T16-T8)+ \\ & \quad \text{fvmin}*V\text{min}2*(C16*T16-C8*T8)\end{aligned} \quad (3)$$

The first term in the equation above (Lkg2*T16) is a source of potential energy savings arising from power gating one Subslice 14 to reduce leakage dissipation. Given that T16<=T8, the second term of the equation ((Lkg2+Lkgrest) *(T16−T8)) may reduce the energy savings provided by the first term. As is evident in the example of FIG. 2, if the workload is light and bursty enough, then T8 will in many cases be the same as, or slightly larger than T16 so the impact of this second term may often be small. The third term in equation (3) may be positive or negative, depending on the relative values of C16 and C8. In either case, equation (3) may aid in determining whether power gating from 16 EU/2 Sampler mode down to 8 EU/1 Sampler mode provides energy savings or not as described more fully below.

Note that most values in equation (3) are known. Leakage of a part is fused in and from that the leakage of any portion of the part, e.g., the leakage of a Subslice 14, can be calculated, since the Subslice 14 represents a known portion of the overall gate count. A thermal sensor reading, to read the current junction temperature, may also be required, as leakage is a function of temperature. The values of T16 and T8 can be calculated as described above. The operating voltage Vmin and frequency fvmin are also known. If GFX core 12 is currently operating in 16 EU/2 Sampler mode, then C16 can be measured using energy counters (not shown) forming a part of GFX core 12. Energy counters can be used to assess current power dissipation and, therefore, current switching capacitance C16. While the value, C8, is unknown, its value can be estimated with post-silicon characterization. For example, energy monitor counters can be used to correlate, via a curve-fitting method, the values of the counters to not only the switching capacitance of GFX core 12 in its current 16 EU/2 Sampler configuration (C16) but also to that of the target configuration operating in 8 EU/1 Sampler mode if power gating is to occur. Post-silicon characterization in both 16 EU/2 Sampler mode and 8 EU/1 Sampler mode may be performed for a range of workloads and characterizations thusly obtained.

While such post-silicon characterization provides an approximate value for C8 which may be sufficiently accurate in many cases with differing workloads, such an approximation may not be of sufficient accuracy in all cases. After a decision is made to switch from 16 EU/2 Sampler mode to 8 EU/1 Sampler mode, the value of C8 can be measured, such as by using the energy counters in GFX core 12. The measured value of C8 may be different than the one previously estimated, not only because the estimate was not accurate enough, but potentially also because the characteristics of the workload may have changed since the estimation was done. If the measured C8 proves to be much higher than expected indicating that the desired and expected power savings did not result from the power gating, then the decision to power gate may have to be reversed. Note that once there is calculated the number T16 or T8 of clock cycles that would be required in 16 EU/2 Sampler mode or 8 EU/1 Sampler mode to execute a given workload during the decision window, one can determine the duration of RC6 time that would be obtained in either the 16 EU/2 Sampler mode or the 8 EU/1 Sampler mode. If switching to the 8 EU/1 Sampler mode reduces the RC6 residency to 0 (or close to 0), then it may prove undesirable to power gate, since doing so would require raising the voltage and frequency and hence, the power dissipation, to preserve a current frame rate as described above.

Once GFX core 12 has transitioned from 16 EU/2 Sampler mode to 8 EU/1 Sampler mode, utilization of the GFX core 12 is monitored to determine whether it should at some time later transition back to 16 EU/2 Sampler mode again. Such a transition may be preferable if the workload activity has become heavier. Ideally, GFX core 12 operating in 8 EU/1 Sampler mode could measure its utilization during a period of clock cycles and use such measurement to estimate what its utilization would have been had it operated in 16 EU/2 Sampler mode instead. Unfortunately, such determination may prove impracticable as the same 8 EU/1 Sampler mode GFX core 12 activity can map to many different types of 16 EU/2 Sampler mode GFX core 12 activities.

Figure 3:
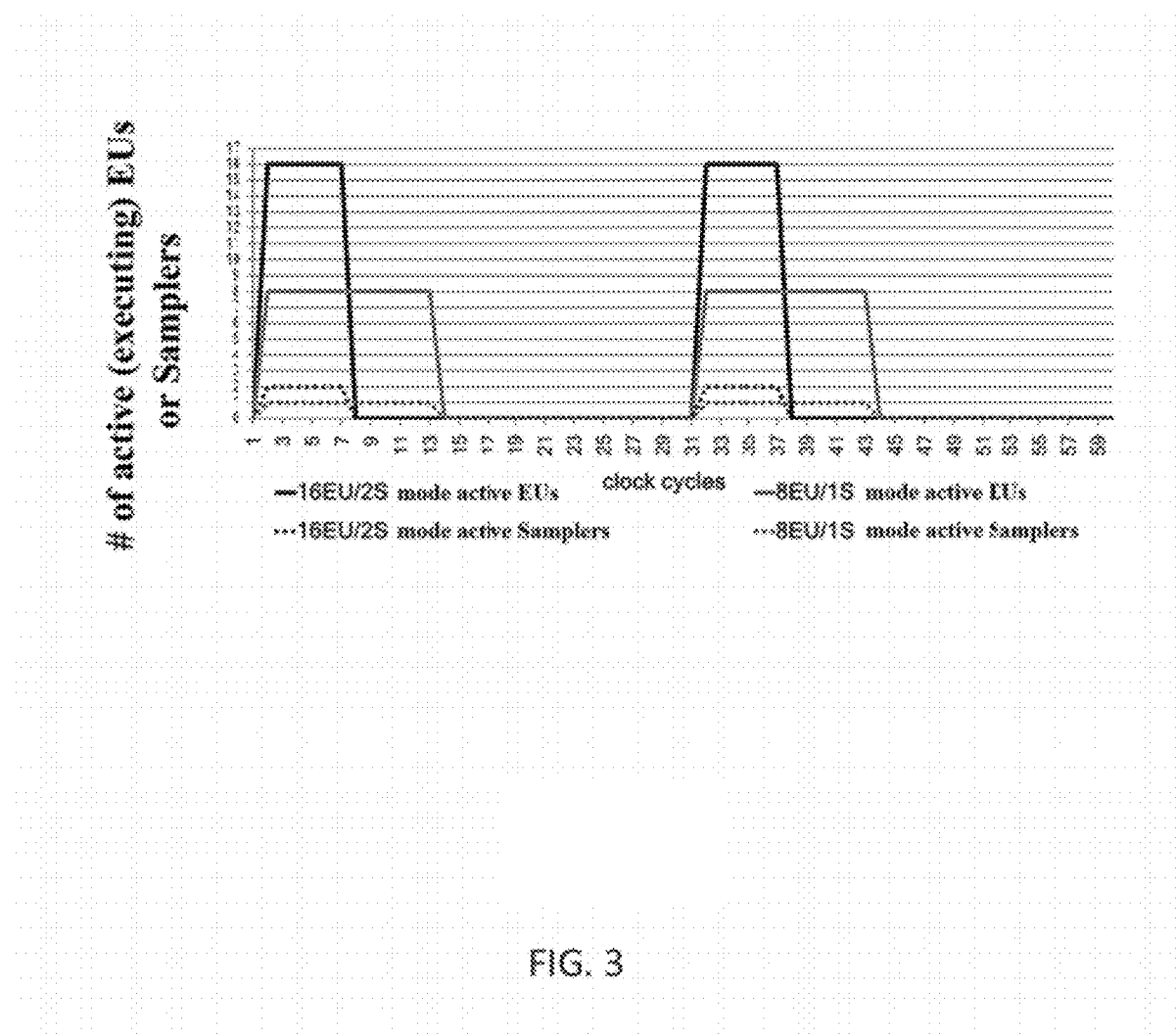
FIG. 3 is a diagram of the operation of a GFX core 12 according to an alternative exemplary and non-limiting embodiment.

With reference to FIG. 3 there is illustrated an example of the operation of GFX core 12 where the 8 EU/1 Sampler mode GFX core 12 activity is similar to that illustrated in FIG. 2, at least in terms of overall RC0 residency. However, the corresponding 16 EU/2 Sampler mode GFX core 12 activity shown in FIG. 3 is quite different than that illustrated in FIG. 2. With reference to the example of FIG. 3, it would make sense to power up one Subslice 14 and transition from 8 EU/1 Sampler mode to 16 EU/2 Sampler mode, as doing so would significantly reduce the overall RC0 residency of GFX core 12. On the other hand, with reference to the example of FIG. 2, it would not make sense to transition from 8 EU/1 Sampler mode to 16 EU/2 Sampler mode, since doing so would not significantly change the overall RC0 residency and would simply add the leakage power of the second Subslice 14' without any corresponding power or performance benefit.

In accordance with an exemplary and non-limiting embodiment, the RC6 residency of the 8 EU/1 Sampler mode GFX core 12 is tracked over a period of time. If, over the period of time, all eight EUs 16 are found to be utilized and the overall RC6 residency is less than a predetermined threshold, such findings may serve as an indication of a possibly heavier and sustained workload. In such a case, it is probable that transitioning GFX core 12 to 16 EU/2 Sampler mode and powering up its second Subslice 14 would be more power-efficient than remaining in 8 EU/1 Sampler mode. Once in 16 EU/2 Sampler mode, one can measure the utilization of GFX core 12 as described above to determine whether it is more power efficient to remain in 16 EU/2 Sampler mode or whether GFX core 12 should power down again and transition back to 8 EU/1 Sampler mode.

As is evident, it is beneficial to adopt a strategy that avoids transitioning back and forth between the 16 EU/2 Sampler mode and 8 EU/1 Sampler mode too frequently. In accordance with an exemplary and non-limiting embodiment, the overall scheme of power gating or, conversely, "ungating" GFX core 12 is implemented based on the principle of powering up "fast" and powering down "slow". As used herein, "ungating" or "power ungating" refers to increasing the number of Subslices 14 and/or the number of EUs 16 and or the number of Samplers 18 available for processing in a GFX core 12.

Because operating with a single or reduced number of Subslices 14 may in some cases negatively impact performance, it may be preferable to, in the present example, power up to two Subslices 14, 14' as soon as there is some indication that the workload is becoming more intensive and GFX core 12 is required to deliver more performance. On the other hand, if the current workload seems to be sufficiently light to allow for power gating some EUs 16 or a Subslice 14, 14' of GFX core 12, there is a relatively little negative impact resulting from waiting a short while longer before committing to power gating a portion of GFX core 12 specifically to reduce the risk of implementing the power gating decision prematurely. As a result, in an exemplary embodiment, one can use a longer duration decision window for power gating and a shorter one for power ungating.

One potential complication arising from such a strategy is that the use a relatively short decision window in determining to power ungate from 8 EU/1 Sample mode to 16 EU/2 Sample mode may lead one to repeatedly make erroneous mode transitions in the case of light periodic workloads such as the one illustrated in FIG. 2. If the chosen decision window is as long as (or shorter than) the duration of periodic GFX core 12 activity as illustrated in FIG. 2, then, if the decision window overlaps with the GFX core 12 activity, a decision will be quickly made to power ungate and transition to 16 EU/2 Sampler mode, only to find out, in the next decision window, that GFX core 12 is idle and in RC6 state again. This suboptimal decision to power ungate may be taken repeatedly each time GFX core 12 is active for short periods of time, as part of its periodic pattern of light and unsustained activity.

To address this possibility, in accordance with an exemplary and non-limiting embodiment, the required condition to facilitate the power ungating of GFX core 12 described above is modified. Specifically, while operating in 8 EU/1 Sampler mode, GFX core 12 keeps track of periodic patterns of light activity that its current workload may exhibit and measures RC6 residency in each of a number of decision windows. If the measured RC6 residency in a present decision window falls below a certain threshold and that high activity was not part of the expected periodic activity pattern that the workload has been exhibiting, then the decision to power ungate to 16 EU/2 Sampler mode can be taken.

Figure 4:
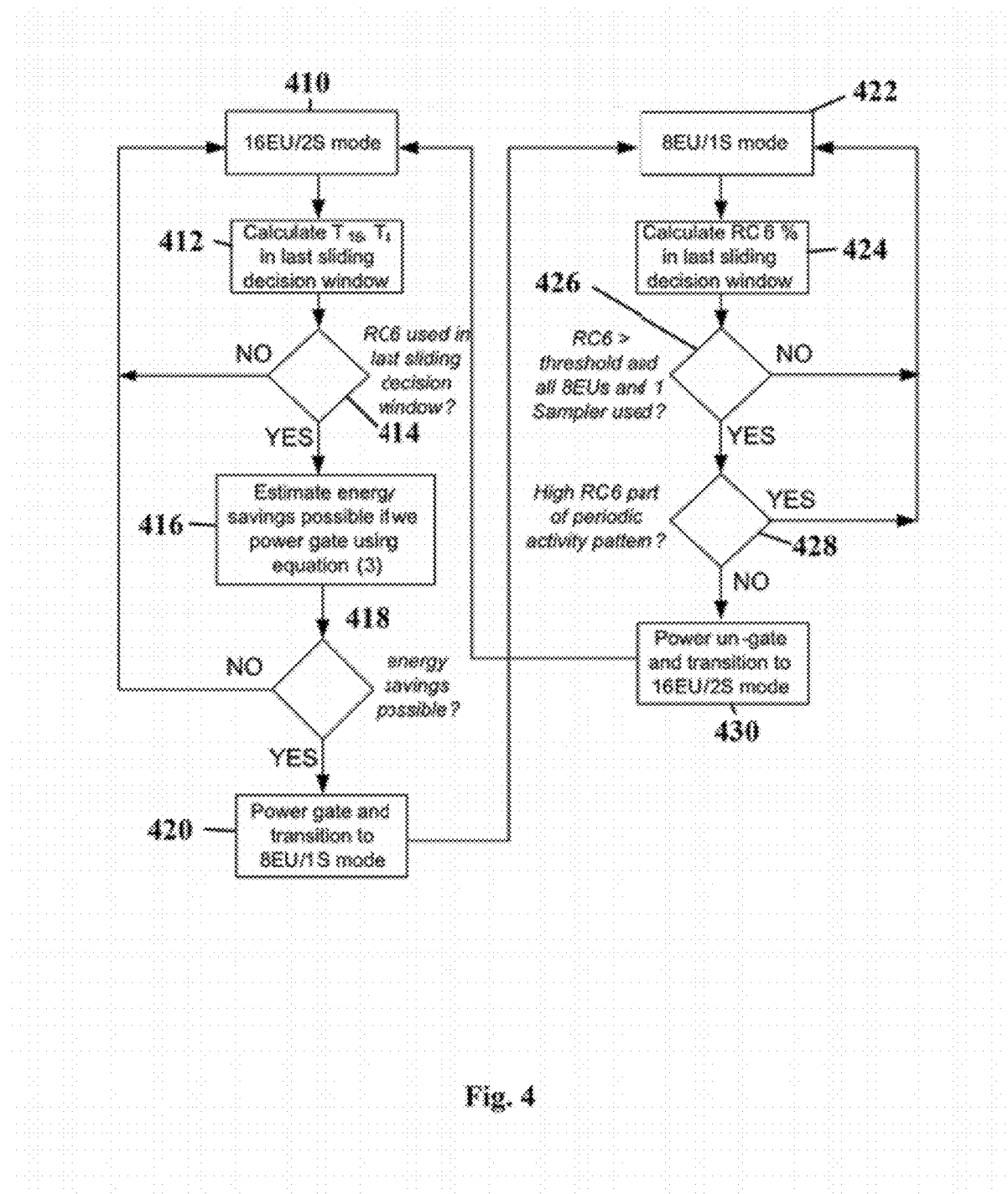
FIG. 4 is a flow diagram of a method according to an exemplary and non-limiting embodiment.

With reference to FIG. 4, there is illustrated a flow chart of an exemplary and non-limiting embodiment as described above. While described with reference to the case wherein GFX core 12 transitions between 16 EU/2 Sampler mode and 8 EU/1 Sampler mode, one skilled in the art would understand that the algorithm embodied in this flowchart can be generalized to the case involving more Subslices 14 or EUs 16 and/or more options for power gating or ungating different combinations of Subslices 14 and/or EUs 16.

At block 410, GFX core 12 operates in a 16 EU/2 Sampler mode. At block 412, a measurement of T16 and T8 is performed for a first decision window. Specifically, there is calculated the number of and of clock cycles that would be required in 16 EU/2 Sampler mode (T16) or 8 EU/1 Sampler mode (T8) to execute a given workload during the decision window. At block 414, a determination is made whether or not GFX core 12 operated in an RC6 state during the decision window. If GFX core 12 did not so operate, indicating a relatively high workload, processing returns to block 410 and GFX core 12 continues to operate in 16 EU/2 Sampler mode. If it is determined that GFX core 12 did operate for a period of time within the decision window in an RC6 state, processing proceeds to block 416.

At block 416, a determination is made of possible savings in energy consumption/dissipation by power gating to an 8 EU/1 Sampler mode. Specifically this determination is made in accordance with equation 3 as described above. Processing then continues to block 418 whereat, if energy savings are not possible, processing returns to block 410 and GFX core 12 continues to operate in 16 EU/2 Sampler mode. Conversely, if it is determined energy savings are possible, processing continues to block 420 whereat GFX core 12 power gates to transition to operation in 8 EU/1 Sampler mode and processing continues to block 422 whereat GFX core 12 commences operation in 8 EU/1 Sampler mode.

Figure 5:
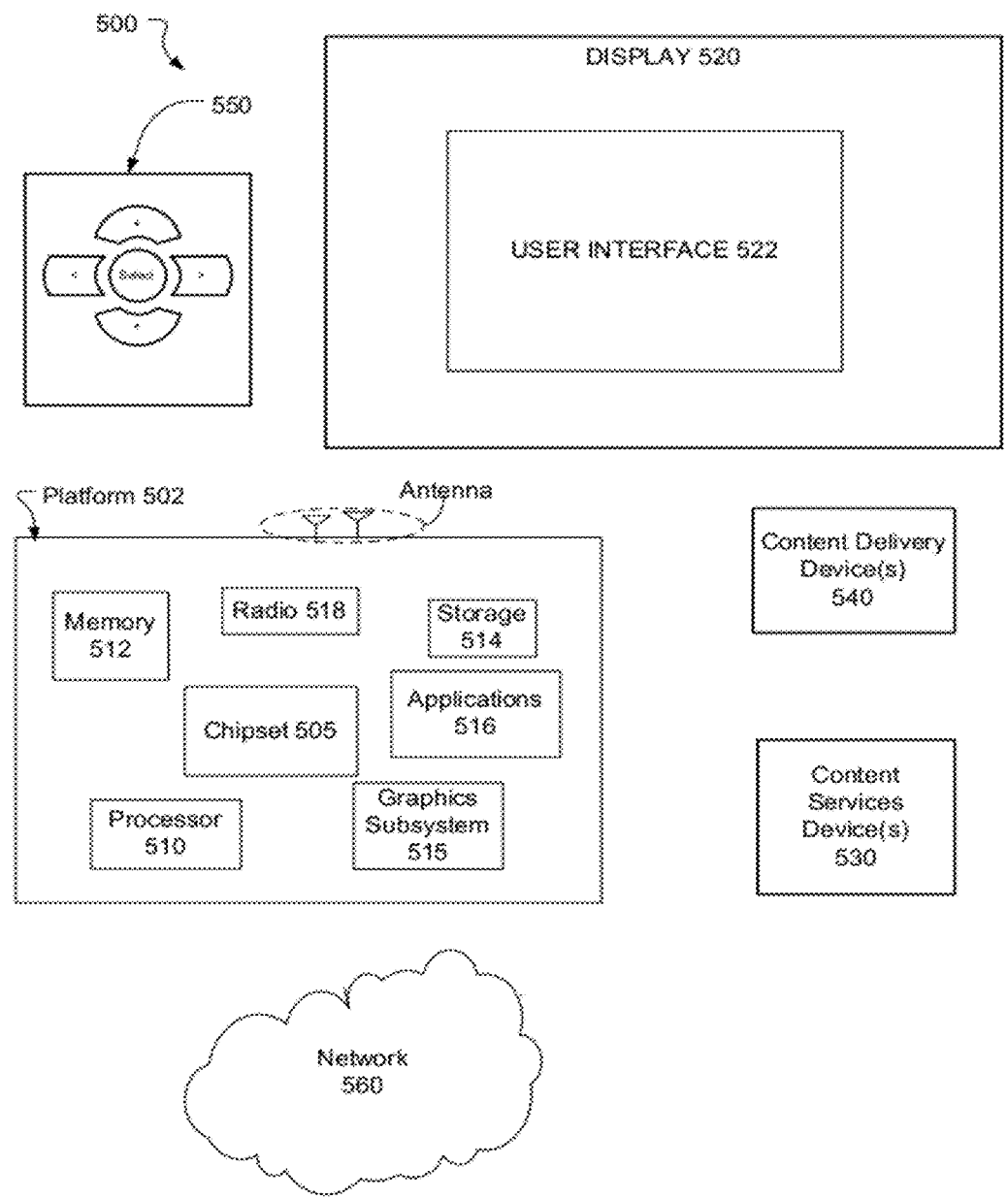
FIG. 5 illustrates another system in accordance with some embodiments.
Figure 6:
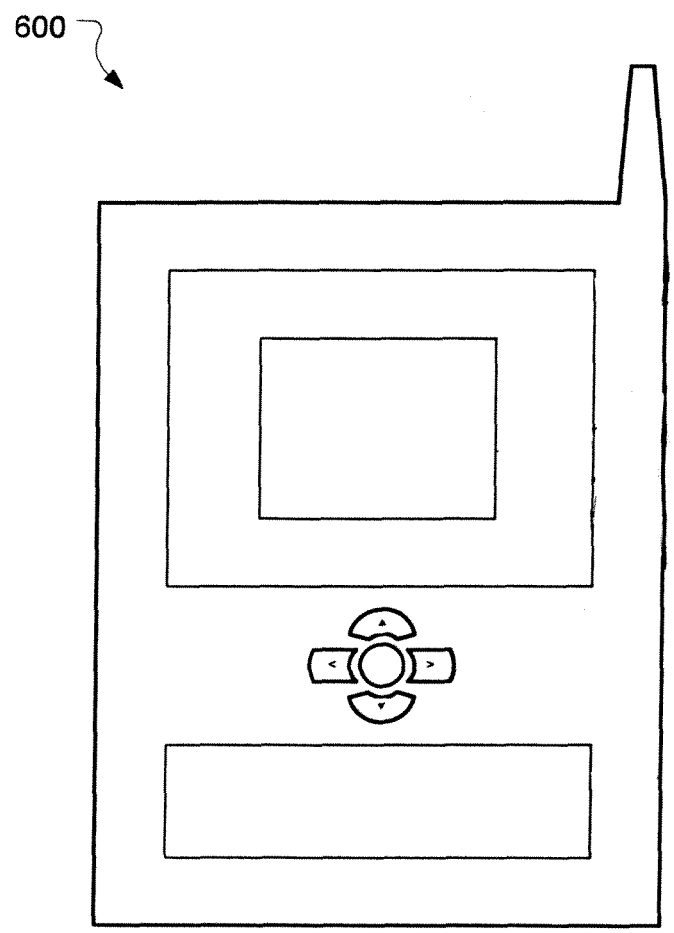
FIG. 6 is an example of a small form factor device in accordance with some embodiments.

Processing then proceeds to block 424 whereat a determination is made of the percentage of time that GFX core 12 operates in RC6 state over a second sliding decision window. Processing then continues to block 426 whereat a check is performed to see if the percentage of time operating in RC6 state from block 424 exceeds a predetermined threshold and all eight EUs 16 and one Sampler 18 were in use during the second decision window. If either condition is found to be false, processing returns to block 422 whereat processing continues in 8 EU/1 Sampler mode. If, conversely, both conditions are satisfied, processing continues to block 428 whereat it is determined if the high RC6 percentage is part of a periodic activity pattern as described above. If the high RC6 percentage is determined to be part of a periodic activity pattern as described above, processing returns to block 422 whereat processing continues in 8 EU/1 Sampler mode. If, conversely, it is determined that the high RC6 percentage is not part of a periodic activity pattern as described above, processing proceeds to block 410 whereat processing transitions back to 16 EU/2 Sampler mode at 430. FIG. 5 illustrates a system 500 in accordance with some embodiments. The system 500 comprises a display 520, a user interface 522, a selector 550, a platform 502, a content delivery device 540, a content service device 530 and a network 560. The platform 502 comprises an antenna, memory 512, radio 518, storage 514, chipset 505, applications 516, processor 510 and graphics subsystem 515. FIG. 6 is an example of a small form factor device 600 in accordance with some embodiments.

As used herein, the terms "information" and "data" may be used interchangeably and may refer to any data, text, voice, video, image, message, bit, packet, pulse, tone, waveform, and/or other type or configuration of signal and/or information. Information may comprise information packets transmitted, for example, in accordance with the Internet Protocol Version 6 (IPv6) standard as defined by "Internet Protocol Version 6 (IPv6) Specification" RFC 1883, published by the Internet Engineering Task Force (IETF), Network Working Group, S. Deering et al. (December 1995). Information may, according to some embodiments, be compressed, encoded, encrypted, and/or otherwise packaged or manipulated in accordance with any method that is or becomes known or practicable.

In addition, some embodiments described herein are associated with an "indication". As used herein, the term "indication" may be used to refer to any indicia and/or other information indicative of or associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

Numerous embodiments are described in this patent application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

What is claimed is:

1. A method comprising:
   executing a workload on a graphics (GFX) core in a first mode the GFX core comprising a plurality of Subslices wherein each of the plurality of Subslices receives power;
   calculating a number of clock cycles, Tfirst mode, required for the GFX core to perform the workload in the first mode during a first decision window comprising a plurality of clock cycles;
   calculating a number of clock cycles, Tsecond mode, required for the GFX core to perform the workload in a second mode during the first decision window wherein the second mode comprises executing the workload with fewer of the plurality of Subslices receiving power than when executing the workload in the first mode;
   determining if the GFX core operated in a power down state during the first decision window;
   determining, based in part upon Tfirst mode and Tsecond mode, if an energy savings is possible by transitioning the GFX core to the second mode if it is determined that the GFX core operated in a power down state during the first decision window; and
   transitioning the GFX core to the second mode if it is determined that an energy savings is possible by transitioning the GFX core to the second mode, wherein determining if an energy savings is possible comprises:
   evaluating:
   Lkgsecond mode*Tfirst mode+(Lkgsecond mode+Lkgrest)*(Tfirst mode−Tsecond mode)+fvmin*Vmin*(Cfirst mode*Tfirst mode−Csecond mode*Tsecond mode)
   where Lkgsecond mode is a power leakage of the one or more Subslices receiving power in the second mode, Lkgrest is a power leakage of the GFX core exclusive of the power consumed by the plurality of Subslices, fvmin is the operating frequency of the GFX core, Vmin is the operating voltage of the GFX core, Cfirst mode is the switching capacitance of the GFX core executing in the first mode, and Csecond mode is the switching capacitance of the GFX core executing in the second mode; and
   determining that the energy savings is possible if a result of the evaluation is a positive quantity.

2. The method of claim 1 further comprising estimating a value of Csecond mode.

3. The method of claim 2 wherein estimating the value of Csecond mode comprises estimating the value of Csecond mode utilizing post-silicon characterization.

4. The method of claim 1 wherein the power down state is an RC6 state.

5. An article of manufacture comprising:
   a non-transitory computer readable medium having stored thereon instructions which, when executed by a processor, cause the processor to:
   execute a workload on a graphics (GFX) core in a first mode the GFX core comprising a plurality of Subslices wherein each of the plurality of Subslices receives power;
   calculate a number of clock cycles, Tfirst mode, required for the GFX core to perform the workload in the first mode during a first decision window comprising a plurality of clock cycles;
   calculate a number of clock cycles, Tsecond mode, required for the GFX core to perform the workload in a second mode during the first decision window wherein the second mode comprises executing the workload with fewer of the plurality of Subslices receiving power than when executing the workload in the first mode;
   determine if the GFX core operated in a power down state during the first decision window;
   determine, based in part upon Tfirst mode and Tsecond mode, if an energy savings is possible by transitioning the GFX core to the second mode if it is determined that the GFX core operated in a power down state during the first decision window; and
   transition the GFX core to the second mode if it is determined that an energy savings is possible by transitioning the GFX core to the second mode, wherein the instructions further cause the processor to determine if an energy savings is possible by evaluating:
   Lkgsecond mode*Tfirst mode+(Lkgsecond mode+Lkgrest)*(Tfirst mode−Tsecond mode)+fvmin*Vmin*(Cfirst mode*Tfirst mode−Csecond mode*Tsecond mode)
   where Lkgsecond mode is a power leakage of the one or more Subslices receiving power in the second mode, Lkgrest is a power leakage of the GFX core exclusive of the power consumed by the plurality of Subslices, fvmin is the operating frequency of the GFX core, Vmin is the operating voltage of the GFX core, Cfirst mode is the switching capacitance of the GFX core executing in the first mode, and Csecond mode is the switching capacitance of the GFX core executing in the second mode; and
   determining that the energy savings is possible if a result of the evaluation is a positive quantity.

6. The article of claim 5 wherein the instructions further cause the processor to estimate a value of Csecond mode.

7. The article of claim 6 wherein the instructions further cause the processor to estimate the value of Csecond mode utilizing post-silicon characterization.

8. The article of claim 5 wherein the power down state is an RC6 state.

9. A system comprising:
   a processor; and
   a non-transitory computer readable medium having stored thereon instructions which, when executed by the processor, cause the processor to:
   execute a workload on a graphics (GFX) core in a first mode the GFX core comprising a plurality of Subslices wherein each of the plurality of Subslices receives power;
   calculate a number of clock cycles, Tfirst mode, required for the GFX core to perform the workload in the first mode during a first decision window comprising a plurality of clock cycles;

calculate a number of clock cycles, Tsecond mode, required for the GFX core to perform the workload in a second mode during the first decision window wherein the second mode comprises executing the workload with fewer of the plurality of Subslices receiving power than when executing the workload in the first mode;

determine if the GFX core operated in a power down state during the first decision window;

determine, based in part upon Tfirst mode and Tsecond mode, if an energy savings is possible by transitioning the GFX core to the second mode if it is determined that the GFX core operated in a power down state during the first decision window; and transition the GFX core to the second mode if it is determined that an energy savings is possible by transitioning the GFX core to the second mode, wherein the instructions further cause the processor to determine if an energy savings is possible by evaluating:

Lkgsecond mode*Tfirst mode+(Lkgsecond mode+Lkgrest)*(Tfirst mode−Tsecond mode)+fvmin*Vmin*(Cfirst mode*Tfirst mode−Csecond mode*Tsecond mode)

where Lkgsecond mode is a power leakage of the one or more Subslices receiving power in the second mode, Lkgrest is a power leakage of the GFX core exclusive of the power consumed by the plurality of Subslices, fvmin is the operating frequency of the GFX core, Vmin is the operating voltage of the GFX core, Cfirst mode is the switching capacitance of the GFX core executing in the first mode, and Csecond mode is the switching capacitance of the GFX core executing in the second mode; and determining that the energy savings is possible if a result of the evaluation is a positive quantity.

10. The system of claim 9 wherein the instructions further cause the processor to estimate a value of Csecond mode.

11. The system of claim 10 wherein the instructions further cause the processor to estimate the value of Csecond mode utilizing post-silicon characterization.

12. The system of claim 9 wherein the power down state is an RC6 state.

* * * * *